(12) United States Patent
Jalali et al.

(10) Patent No.: US 8,654,441 B2
(45) Date of Patent: Feb. 18, 2014

(54) DIFFERENTIAL INTERFERENCE CONTRAST SERIAL TIME ENCODED AMPLIFIED MICROSCOPY

(71) Applicant: The Regents of the University of California, Oakland, CA (US)

(72) Inventors: Bahram Jalali, Los Angeles, CA (US); Ali Motafakker-Fard, Revere, MA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/668,239

(22) Filed: Nov. 3, 2012

(65) Prior Publication Data

US 2013/0135529 A1    May 30, 2013

Related U.S. Application Data

(63) Continuation of application No. PCT/US2011/041283, filed on Jun. 21, 2011.

(60) Provisional application No. 61/357,042, filed on Jun. 21, 2010.

(51) Int. Cl.
*G02B 21/00*    (2006.01)

(52) U.S. Cl.
USPC .......................................... 359/371; 359/837

(58) Field of Classification Search
USPC ................... 359/370, 371, 831, 837
See application file for complete search history.

(56) References Cited

U.S. PATENT DOCUMENTS

| 5,133,602 A  * | 7/1992  | Batchelder et al. ........... 356/615 |
| 6,317,259 B1 * | 11/2001 | Matsui ......................... 359/371 |
| 6,323,995 B1 * | 11/2001 | Takahama et al. ............ 359/371 |

OTHER PUBLICATIONS

Korean Intellectual Property Office, International Search Report and Written Opinion, issued on Apr. 13, 2012, for corresponding International Patent Application No. PCT/US2011/041283 (pp. 1-9) with claims searched (pp. 10-16) pp. 1-16.
Goda, K. et al. "Serial time-encoded amplified imaging for real-time observation of fast dynamic phenomena," Nature, Apr. 2009, vol. 458, No. 7980, pp. 1145-1149.
Goda, K. et al. "Amplified dispersive Fourier-transform imaging for ultrafast displacement sensing and barcode reading," Applied Physics Letters, Oct. 2008, vol. 93, No. 131109, pp. 1-3.
Tsia, K. et al. "Performance of serial time-encoded amplified microscope," CLEO/QELS Conference, May 2010, CTH7, pp. 1-2.
Lessor, D.L., et al. "Quantitative surface topography determination by Nomarski reflection microscopy," Journal of Optical Society of America, Feb. 1979, vol. 69, No. 2, pp. 357-366.

(Continued)

*Primary Examiner* — Frank Font
(74) *Attorney, Agent, or Firm* — John P. O'Banion

(57) ABSTRACT

We describe methods and apparatus for high-speed high-contrast imaging one-, two- and three-dimensional imaging enabled by differential interference contrast time encoded amplified microscopy of transparent media without the need for chemical staining, that are suitable for a broad range of applications from semiconductor process monitoring to blood screening. Our methods and apparatus build on a unique combination of serial time-encoded amplified microscopy (STEAM) and differential interference contrast (DIC) microscopy. These methods and apparatus are ideally suited for identification of rare diseased cells in a large population of healthy cells and have the potential to revolutionize blood analysis and pathology including identification of cancer cells, such as Circulating Tumor Cells (CTC) in early stage disease.

20 Claims, 5 Drawing Sheets

(56) References Cited

OTHER PUBLICATIONS

Chou, J.O., et al. "Femtosecond real-time single-shot digitizer," Applied Physics Letters, Oct. 16, 2007, vol. 91, (No. 16), pp. 161105-161107.

Chou, D.R., et al. "Real-time spectroscopy with subgigahertz resolution using amplified dispersive Fourier transformation," Applied Physics Letters, Mar. 17, 2008, vol. 92, 111102, pp. 1-3.

European Patent Office, European Extended Supplemental Search Report issued Oct. 13, 2013 for corresponding European Patent Application No. 11827118.8 (PCT/US2011041283) (pp. 1-5) with pending claims (pp. 6-9) pp. 1-9.

Kei Suke Goda et al, "II Phase-contrast serial time-encoded amplified microscopy". Lasers and Electro-Optics 2009 and the European Quantum Electronics Conference. CLEO Europe—EQEC 2009. European Conference on. IEEE. Piscataway. NJ. USA. Jun. 14, 2009.

Chatterjee S: "Design considerations and fabrication techniques of Nomarski reflection microscope", Optical Engineering, Soc. of Photo-Optical Instrumentation Engineers, Bellingham, vol. 42, No. 8, Aug. 1, 2003, pp. 2202-2213.

* cited by examiner

DIFFERENTIAL INTERFERENCE CONTRAST SERIAL TIME ENCODED AMPLIFIED MICROSCOPY

CROSS-REFERENCE TO RELATED APPLICATIONS

This application is a 35 U.S.C. §111(a) continuation of PCT international application number PCT/US2011/041283 filed on Jun. 21, 2011, incorporated herein by reference in its entirety, which is a nonprovisional of U.S. provisional patent application Ser. No. 61/357,042 filed on Jun. 21, 2010, incorporated herein by reference in its entirety. Priority is claimed to each of the foregoing applications.

The above-referenced PCT international application was published as PCT International Publication No. WO 2012/039802 on Mar. 29, 2012 and republished on May 31, 2012, and is incorporated herein by reference in its entirety.

STATEMENT REGARDING FEDERALLY SPONSORED RESEARCH OR DEVELOPMENT

This invention was made with Government support under Grant Number W911 NF-10-1-0006 awarded by US Army Research Office. The Government has certain rights in the invention.

INCORPORATION-BY-REFERENCE OF MATERIAL SUBMITTED ON A COMPACT DISC

Not Applicable

BACKGROUND OF THE INVENTION

1. Field of the Invention

This invention pertains generally to optical imaging devices and methods and more particularly to an apparatus and method for high-speed, high-contrast, real-time, one-, two- and three-dimensional imaging enabled by differential interference contrast time encoded amplified microscopy that is particularly suited for image acquisition of transparent media without staining.

2. Description of Related Art

Optical imaging modalities are widely used for detection, inspection, and diagnostics in numerous industrial, biomedical, and scientific applications. For example, optical microscopy is relied on extensively in hematology for identification of diseased blood cells. While preliminary screening can be performed by techniques such as impedance measurement and laser scattering in a flow cytometer, optical imaging with a microscope that is performed manually by a technician is used for accurate identification of the suspected cells. Similarly, metallurgy and semiconductor processing also rely heavily on optical imaging modalities for imaging of surface scratches, lines and edges, defects, and contaminations inside the material under test.

Another fundamental difficulty in the imaging of biological cells with present optical imaging modalities arises from the fact that cells are transparent and have nearly no contrast with respect to their aqueous surrounding (index contrast typically=0.05). Because of this, cells are usually stained with dyes to provide contrast with the surrounding medium and also between structural components within a single cell.

Some imaging modalities, such as differential interference contrast microscopy (DIC) and phase-contrast (PC) microscopy, can capture images of transparent objects without the need for chemical staining. Although a DIC microscope gives high resolution images with high clarity, they have slow frame rates, limited by the CCD or the CMOS image sensor array used in all conventional microscopes. Therefore, DIC microscopy cannot be used for applications that require monitoring of dynamic samples in real-time with a high throughput such as flow cytometry.

High-throughput imaging in such applications is highly desirable, but extremely challenging. For instance, high-throughput screening of biological cells that show nearly no contrast with respect to their aqueous surroundings makes finding of rare diseased cells in a large population of healthy cells very difficult. However, conventional techniques that are used for performing this task rely on CCD (charge-coupled device) and CMOS (complementary metal-oxide-semiconductor) image sensors. As a result, the image acquisition throughput is limited by that of CCD and CMOS cameras. More importantly, the shutter speed of even the fastest cameras is too slow, resulting in significant blurring of images during high-speed screening.

The recently introduced imaging technology known as serial time-encoded amplified imaging (STEAM) overcomes limitations in conventional imaging and provides ~1000 times higher frame rates and shutter speeds than available with current image sensors (i.e., CCD and CMOS cameras). This system replaces the conventional CCD/CMOS camera with a single-pixel photodetector. As a result, the trade-off between sensitivity and frame rate is overcome.

The STEAM approach exploits an amplified space-to-time mapping technique to encode the spatial information of an object into a one-dimensional (1D) serial time-domain optical waveform and optically amplifies the image, simultaneously. The high-speed capability of a STEAM imager enables its use for applications in which high-throughput screening of an object is of interest, such as blood cell screening. However, it cannot be used on transparent samples such as cells but rather it is limited to opaque samples or samples with high refractive index or absorption contrast. Therefore, the STEAM imager is inadequate for imaging of transparent objects such as biological cells due to their poor refractive-index contrast with their surroundings. While these objects can be stained with dyes to increase their contrast, chemical staining often requires careful sample preparation and is unsatisfactory.

Accordingly, there is a need for an imaging apparatus and method that can provide contrast without the need for staining and also one that has a very high frame rate and shutter speed to allow imaging of large numbers of cells during flow in a reasonably short period of time. The present invention satisfies these needs as well as others and is generally an improvement over the art.

BRIEF SUMMARY OF THE INVENTION

The present invention is directed to methods and apparatus for high-speed high-contrast imaging of transparent media without the need for chemical staining that is suitable for a broad range of applications from semiconductor process monitoring to blood screening. The methods and apparatus build on a unique combination of serial time-encoded amplified microscopy (STEAM) and differential interference contrast (DIC) microscopy. The methods and apparatus of the present invention are ideally suited for the identification of rare diseased cells in a large population of healthy cells and have the potential to revolutionize blood analysis and pathology including identification of cancer cells, such as Circulating Tumor Cells (CTC) in early stage disease.

The methods and apparatus for differential interference contrast serial time encoded amplified microscopy obtains differential phase contrast images of an object with very low dwell time and at very high frame rates. This is performed by using optical spatial dispersers and a Nomarski prism (also known as modified Wollaston prism). The Nomarski prism consists of two birefringent crystal wedges that function to increase the image contrast.

The illustrative apparatus produces two spatially-dispersed orthogonally-polarized beams such that each wavelength component travels through two adjacent points on the analyzed object with different polarizations. As a result, the two illumination beams are encoded by the phase information associated with the optical path length (i.e., the product of the refractive index and thickness) of the object. Therefore, by recombining the two phase-encoded beams using another Nomarski prism (similar to the first one), the differential phase information of every two adjacent points (illuminated by each wavelength component of the illumination beam) of the object is converted into the intensity of that wavelength component. In other words, the optical path difference between the two adjacent points (illuminated by each wavelength component of illumination beam) results in constructive/deconstructive interference of that wavelength component.

The image-encoded spectrum is then converted into a temporal data stream, and simultaneously amplified using amplified dispersive Fourier transformation (ADFT) that is an optical process that maps the optical spectrum into the time-domain using group-velocity dispersion. The temporal waveform containing the image is then captured by a photo-detector and digitized by a conventional electronic digitizer.

Accordingly, an aspect of the invention is to provide non-invasive, high-speed, high-contrast imaging that can be adapted to a broad range of detection, inspection and diagnostic applications.

Another aspect of the invention is to provide a system for high throughput microfluidic screening of nearly transparent objects such as rare diseased cells in a large population of normal cells where conventional screening techniques would fail.

Another aspect of the invention is to provide a system for one-, two- and three dimensional imaging adaptable to a wide variety of uses.

A further aspect of the invention is to provide an apparatus and method that employs an amplified space-to-time mapping to encode the spatial information of an object into a one-dimensional serial time-domain optical waveform that simultaneously optically amplifies the image.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in methods and apparatus generally illustrated in FIG. 1 through FIG. 4. It will be appreciated that the apparatus embodiments may vary as to configuration and as to the details of the parts, and that the methods may vary as to the specific steps and sequence, without departing from the basic concepts as disclosed herein.

The present invention relates to devices and methods for high-speed high-contrast imaging in one, two or three dimensions that enable image acquisition of transparent media without the need for chemical staining that may be applied in a broad range of applications from semiconductor process monitoring to biological screening. The embodiments of FIG. 1 and of FIG. 2A and FIG. 2B are variations of the same theme and are used to illustrate the preferred apparatus of the invention.

Figure 1:
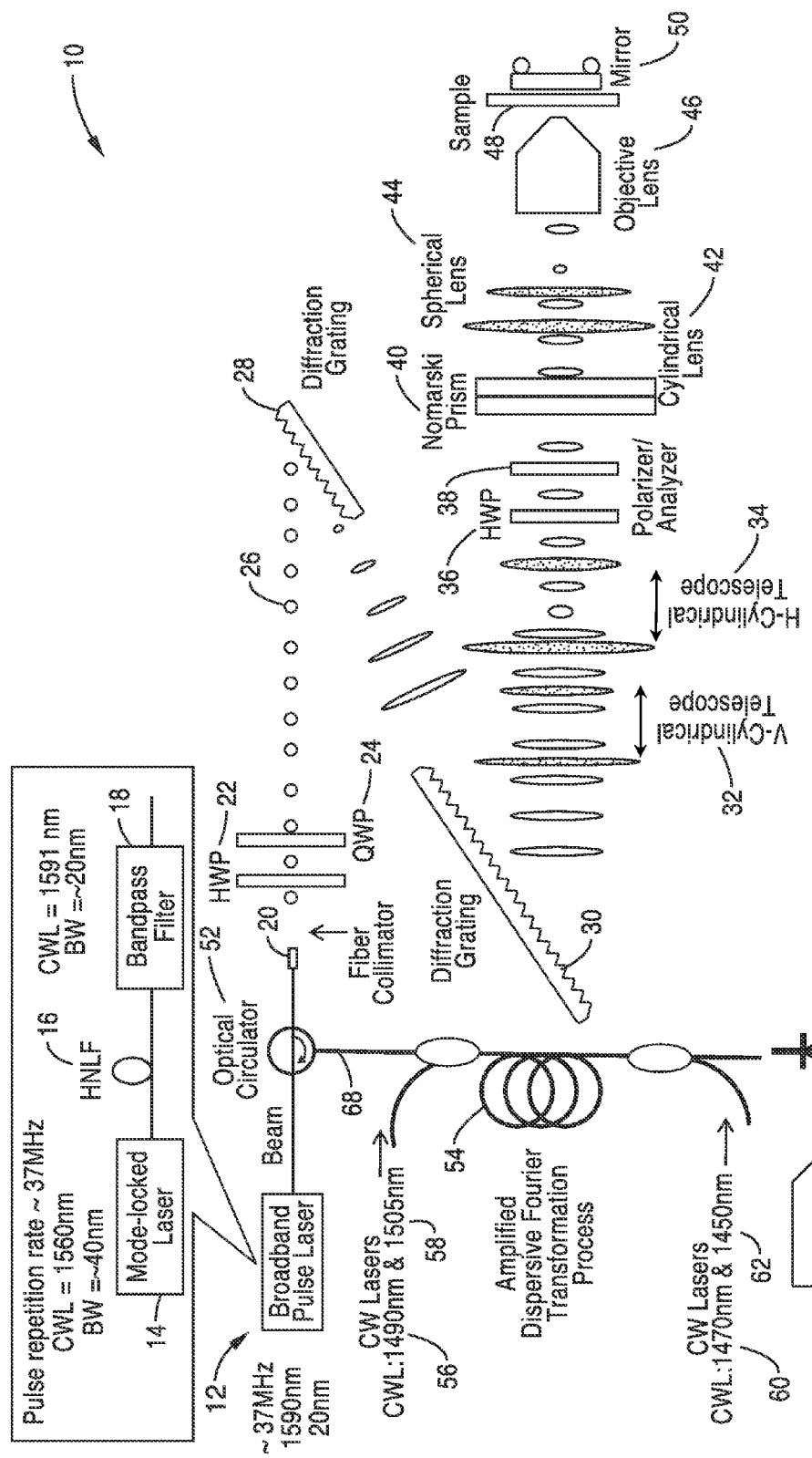
FIG. 1 is a schematic diagram of a one embodiment of a differential interference contrast serial time encoded amplified microscope apparatus according to the invention.
Figure 2A:
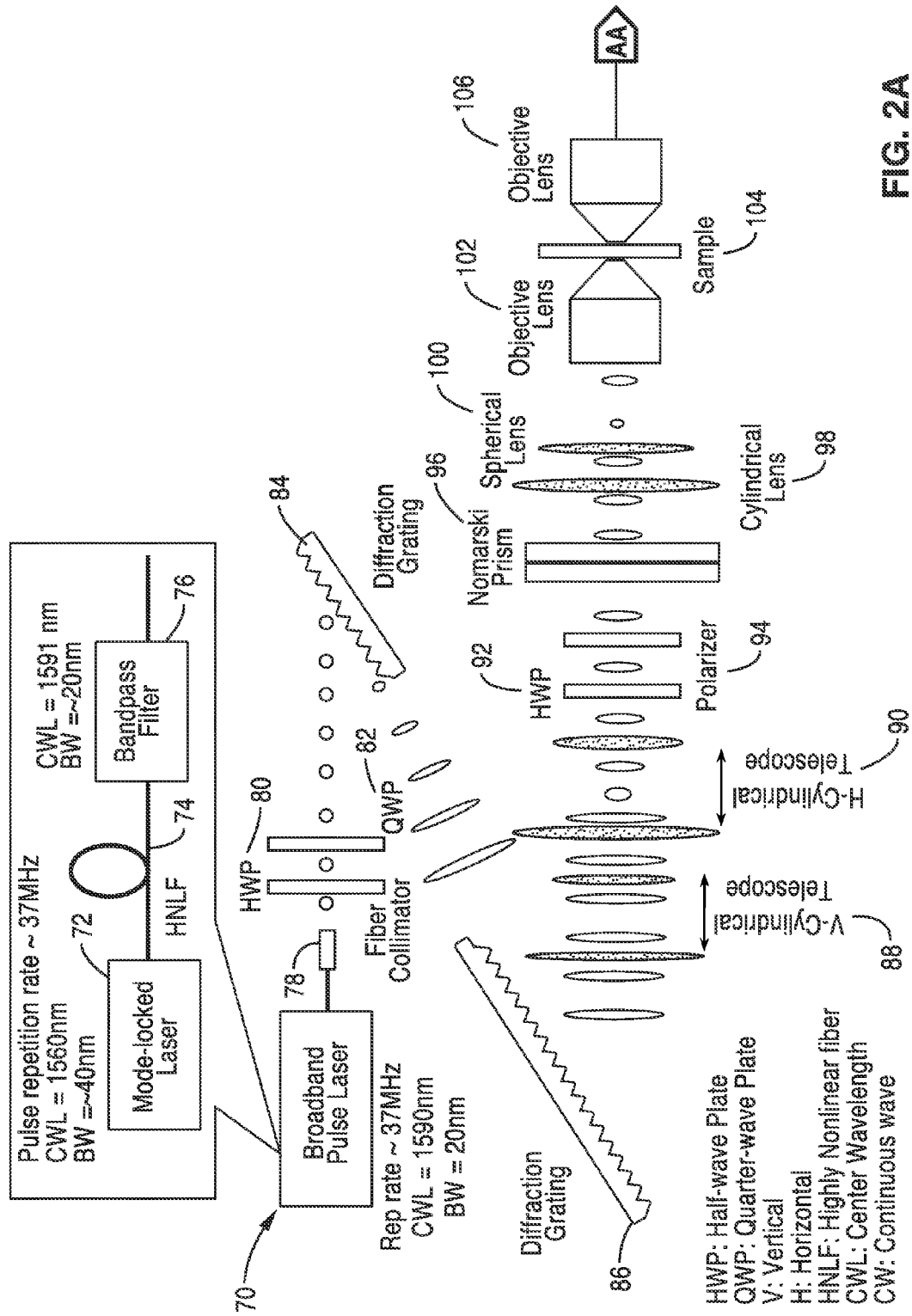
FIG. 2A and FIG. 2B is a schematic diagram of an alternative embodiment of a differential interference contrast serial time encoded amplified microscope apparatus according to the invention.
Figure 2B:
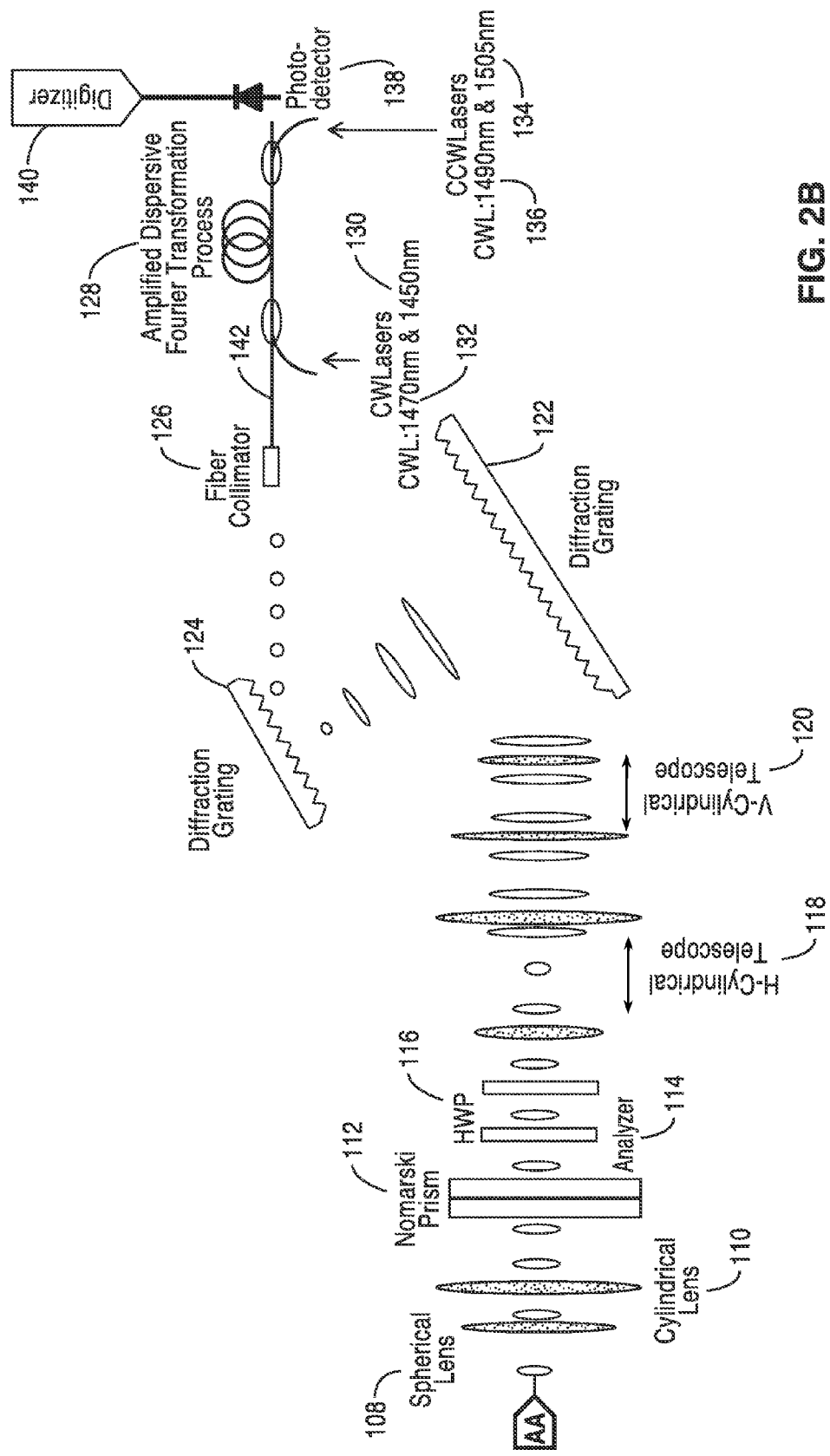

Turning now to the schematic diagram of FIG. 1, one embodiment 10 of the apparatus of the invention is schematically shown. The illustrated apparatus 10 is one adaptation of the invention for differential interference contrast serial time-encoded amplified microscopy of a sample in one dimension. However, two dimensions can be acquired by two orthogonally oriented 1D spatial dispersers etc. Three dimensions can also be acquired by extracting the depth information of the object to be imaged.

Initially, a broadband laser pulse is provided from a broadband laser 12. In the embodiment shown, the broadband laser pulse source 12 is preferably a femtosecond mode-locked fiber laser 14 with a center wavelength of 1560 nm and a pulse repetition rate of ~37 MHz. A highly nonlinear fiber 16 and optical band-pass filter 18 following the laser produce a train of pulses with ~20 nm bandwidth centered at 1591 nm as an illumination beam. It should be appreciated that a broadband pulsed beam can be generated in numerous ways without departing from the teachings of the present invention.

The optical pulses from laser 12 are sent to an optical fiber collimator 20 to ensure a collimated beam 26 in free-space. A half-wave plate (HWP) 22 and a quarter-wave plate (QWP) 24 are optionally used before the diffraction gratings 28 and 30 to ensure maximum diffraction efficiency of the diffraction gratings. Using a pair of diffraction gratings 28, 30 with around 1100 lines/mm groove density, pulses that are spatially-dispersed into a 1D rainbow pattern are produced and ultimately enable a 1D line-scan of the object. An alternative to creating a 1D rainbow pattern is to use virtually imaged phased arrays (VIPA). Another alternative is to use prisms to create the specially dispersed 1D rainbow pattern.

In this illustration, the 1D spatially-dispersed beam from the diffraction gratings 28, 30 is re-sized using two pairs of cylindrical telescope lenses (a vertical pair 32 and a horizontal pair 34) to allow manipulation of the beam in both vertical and horizontal directions. In another embodiment, the beam is resized using a pair of spherical telescopic lenses or by adjusting the orientations of diffraction gratings.

Then, the manipulated 1D spatially-dispersed beam is sent to a half-wave plate 36 and a polarizer 38 to rotate the polarization state of the light and ensure an approximately 45-degree linear polarization incident on the Nomarski prism 40. The Nomarski prism 40 splits the illumination beam into two orthogonally-polarized 1D rainbow patterns (0 and 90 degrees).

Another cylindrical lens 42 is used to make the two orthogonally-polarized 1D rainbow patterns parallel with respect to each other. Also, a cylindrical lens 42, spherical lens 44 and an objective lens 46 are used to focus the illumination onto the sample 48 and ensure a collimated rainbow pattern on the sample object 44. The design of the Nomarski prism 40 and the following optics 42, 44 and 46 in this illustration are such that the two orthogonally-polarized beams are ~3 μm apart at the object in the direction normal to the direction of the line scan, illustrated schematically in FIG. 3.

Figure 3:
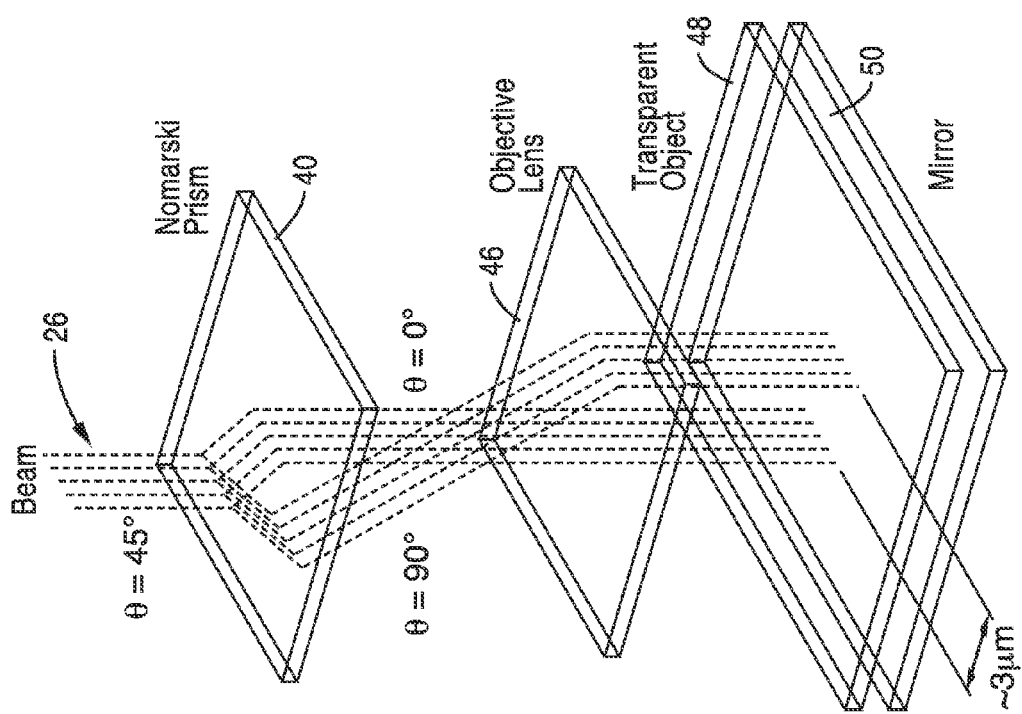
FIG. 3 is a schematic diagram of an illumination beam trace of a section of the embodiment shown in FIG. 1 showing two polarized beams incident on the object that is back reflected by a mirror.

Referring specifically to FIG. 3, the beam trace of each wavelength component of the illumination beam through the Nomarski prism 40 and a single objective lens 46 is generally shown. The θ shown in FIG. 3 is the angle of linear polarization. The two polarized beams are incident to the transparent object such that two incident points on the object are illuminated by each wavelength but with two different polarizations.

A mirror 50 is placed at the back of the sample object 48 in the embodiment of FIG. 1 and FIG. 3 in order to return the phase-encoded beams back to the same optics. This scheme results in double passing of the illumination beams through the object 48, and as a result doubles the phase shifts.

After recombining the phase-encoded beams using the same lenses 42, 44 and 46 and Nomarski prism 40, the spectrally-encoded beam is spatially-compressed using the same pair of diffraction gratings 28, 30, and associated optics. The beam is directed back into an optical fiber 68 using an optical-fiber collimator 20. In this configuration, the polarizer 38 before the Nomarski prism 40 acts the analyzer in the conventional differential interference contrast microscopy. The spectrally-encoded returning beam from fiber 68 is directed to a spool of dispersive fiber 54 (with a preferred dispersion value of −662 ps/nm) via an optical circulator 52 to perform amplified dispersive Fourier transformation. The dispersive fiber 54 is optically pumped by four continuous-wave lasers 56, 58, 60 and 62 providing center wavelengths at 1450 nm, 1470 nm, 1490 nm, and 1505 nm for distributed Raman amplification. In the dispersive medium 54, the spectrum of each interfered pulse is converted into an amplified temporal waveform.

The time-encoded optical pulses are then captured by a high-speed photodetector 64 (bandwidth >10 GHz) and digitized by a real-time digitizer 66 with a 16 GHz bandwidth and 50 GS/s sampling rate, for example. Digital signal processing including background and noise removal may be performed offline to reconstruct the image of the object 48 under examination.

Turning now to the embodiment of FIG. 2A and FIG. 2B, an alternative configuration of the apparatus is generally shown. This embodiment is particularly suited for high-throughput imaging such as cellular screening applications. The broadband pulse laser source 70 is preferably a femtosecond mode-locked fiber laser 72 with a center wavelength of 1560 nm and a pulse repetition rate of ~37 MHz. A highly nonlinear fiber 74 and optical band-pass filter 76 following the laser produces a train of pulses with ~20 nm bandwidth centered at 1591 nm as an illumination beam. Although this configuration is preferred, other laser sources can also be used.

The optical pulses from broadband laser source 70 may be sent to an optical fiber collimator 78 to ensure a collimated beam in free-space. The beam is directed through a half-wave plate (HWP) 80 and a quarter-wave plate (QWP) 82 to the first diffraction grating 84 to a second diffraction grating 86. The optional half-wave plate 80 and a quarter-wave plate 82 are used before the diffraction gratings to ensure maximum diffraction efficiency of the diffraction gratings. A pair of diffraction gratings 84, 86 with approximately 1100 lines/mm groove density is preferred but any groove density may be used. The groove density of the diffraction grating determines the spatial resolution i.e. the number of resolvable points and the higher the groove density the better the spatial resolution. Accordingly, the spatial resolution of the diffraction gratings can be selected based on the characteristics of the objects to be imaged.

The 1D spatially-dispersed beam from the second diffraction grating 86 is re-sized using two pairs of cylindrical telescope lenses (vertical 88 and horizontal 90) in vertical and horizontal directions. Then, the 1D spatially-dispersed beam is sent to a half-wave plate 92 and a polarizer 94 to rotate the polarization state of the light and ensure a 45-degree linear polarization incident on the Nomarski prism 96. The Nomarski prism 96 splits the illumination beam into two orthogonally-polarized 1D rainbow patterns (0 and 90 degrees).

Another cylindrical lens 98 is used to make the two orthogonally-polarized 1D rainbow patterns parallel with respect to each other. Also, a spherical lens 100 and an objective lens 102 are used to focus the illumination onto the sample object 104 and ultimately ensure a collimated rainbow pattern on the object 104. The design of the Nomarski prism 96 and the following optics are such that the two orthogonally-polarized beams are preferably separated between approximately ~1 μm and approximately ~5 μm apart at the object in the direction normal to the direction of the line scan.

Another objective lens 106 and a spherical lens 108 are present on the other side of the sample object 104 to collect the transmitted beams. A cylindrical lens 110 then focuses the two orthogonally-polarized beams on the cross point of the second Nomarski prism 112. The second Nomarski prism 112 is normally identical to the first Nomarski prism 96. An analyzer (i.e., polarizer) 114 picks up the interfered components of the recombined beam. After recombining the phase-encoded beams using the second Nomarski prism 112, the spectrally-encoded beam is re-sized and spatially-compressed using two pairs of cylindrical lenses (horizontal 118 and vertical 120) and a pair of diffraction gratings (preferably the same groove density as the first pair), respectively. Accordingly, the beam from the half wave plate 116 is preferably sized by telescoping lenses 118 and 120 and directed to the third diffraction grating 122 and fourth diffraction grating 124. The beam is then coupled into an optical fiber 142 using an optical-fiber collimator 126 in FIG. 2B.

The resulting spectrally-encoded beam is directed to a spool of dispersive fiber 128 (with dispersion value of −1373 ps/nm) to perform amplified dispersive Fourier transformation, in this embodiment. The dispersive fiber 128 is optically pumped by four continuous-wave lasers 130, 132, 134 and 136 at 1450 nm, 1470 nm, 1490 nm, and 1505 nm for distributed Raman amplification. Optical amplification of the dispersive fiber 128 allows detection of low signals and therefore improves the sensitivity of the technique.

In the dispersive medium 128, the spectrum of each interfered pulse is converted into an amplified temporal waveform. The time-encoded optical pulses are then captured by a high-speed photodetector 138 (bandwidth >10 GHz) and digitized by a real-time digitizer 140 with 16 GHz bandwidth and 50 GS/s sampling rate. Digital signal processing including background and noise removal can then be performed offline to reconstruct the image of the object 104. A differential phase contrast image of the object 104 is obtained with very fast shutter speed and high frame rates.

Figure 4:
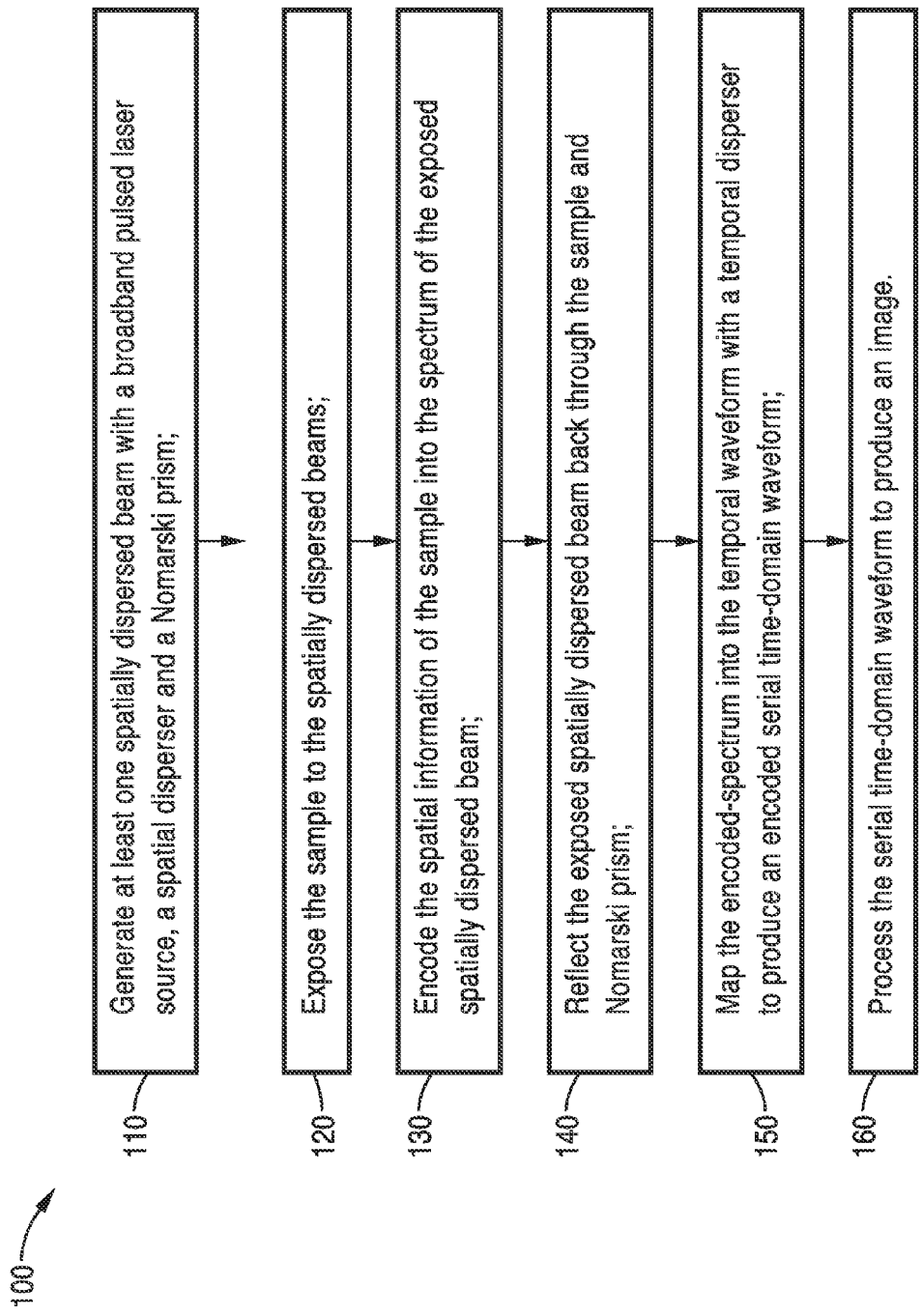
FIG. 4 is a flow diagram for one embodiment of the method for differential interference contrast serial time encoded amplified microscopy according to the invention.

Referring now to the flow diagram of FIG. 4, one embodiment of the method 100 for differential interference contrast serial time encoded amplified microscopy is generally shown. The apparatus shown schematically in FIG. 1 and in FIG. 3 are illustrations of an apparatus that is capable of performing the method. At block 110, at least one spatially dispersed orthogonally polarized laser beam is produced from a laser light source, a spatial disperser and a Nomarski prism. The light source can be incoherent light source, a broadband pulse laser light source and a swept frequency continuous-wave laser light source, for example.

As illustrated in FIG. 1 and FIG. 2A and FIG. 2B, the beam from the laser light source is prepared for exposure on the sample by being spatially dispersed and polarized before being directed through the Nomarski prism to the sample. Spatial dispersion is preferably accomplished with a pair of diffraction gratings but other spatial dispersers may also be used. The spatial dispersive element may also include optical lenses for focusing or half wave plates and quarter wave plates to maximize diffraction efficiency if diffraction gratings are used.

The prepared spatially dispersed beam is directed to the sample at block 120 of FIG. 4, preferably with one or more objective lenses. The spatial information from the exposed sample is encoded onto the spectrum of the beam at block 130. At block 140, the exposed spatially dispersed beams are reflected back through the sample specimen with a reflector as shown in the embodiment shown in FIG. 3. The back reflection from the sample goes back through the objective lens, Nomarski prism and disperser in this embodiment.

The encoded back reflection is mapped into a temporal waveform with a temporal disperser to produce a serial time-domain waveform at block 150 of FIG. 4. At this point the optical spectrum that is encoded with the image of the sample appears as a serial sequence in time. The temporal dispersive element is preferably a dispersive fiber and a process called amplified dispersive Fourier transform (ADFT) is preferably used to map the encoded spectrum into a temporal waveform using group velocity dispersion. Other transforms may also be used.

At block 160, the serialized images are processed. Typically they are detected by a photodiode and then digitized and manipulated with digital processing.

It will be seen that the apparatus and the embodiments illustrated in FIG. 1 through FIG. 4, map an image into a serial time-domain waveform that allows the images to be captured with a single-pixel detector, eliminating the need for CCD/CMOS imagers and the associated trade-off between imaging sensitivity and speed. This mapping is generally accomplished in two steps. The first step is space-frequency mapping. The spatial information of an object is encoded into the spectrum of a broadband laser pulse using a spatial disperser and Nomarski prism. Two spatially-dispersed orthogonally-polarized beams are produced such that each wavelength component of the beam travels through adjacent points on the object with different polarizations.

Consequently, the beams experience different phase shifts associated with the optical path lengths (i.e., the product of the refractive index and thickness) of the two incident points on the object. By recombining the two phase-encoded beams using the same or another Nomarski prism, the differential phase information is converted into an intensity modulation. In other words, the optical path length difference between the two incident points results in constructive/deconstructive interference for each wavelength.

The second step is frequency-time mapping. The image-encoded spectrum is then converted into a temporal data stream and stretched in time, preferably through a process called amplified dispersive Fourier transformation (ADFT). ADFT maps the spectrum of the encoded optical pulse into a temporal waveform using group velocity dispersion. At the same time, the dispersive fiber is pumped with supplemental laser light sources to amplify the image signal and compensate for losses. The time stretch allows the image to be digitized by a conventional electronic digitizer. Also, the optical image amplification overcomes the loss of signal at high frame rates.

The present invention can provide one-dimensional, two dimensional or three-dimensional imaging. The one-dimensional schemes like those shown in FIG. 1 or FIG. 2A and FIG. 2B use diffraction gratings or prisms to generate a 1D pattern for illuminating a specimen. The two-dimensional schemes use two orthogonally oriented 1D dispersers and the frequency-time mapping process is the same as with the 1D schemes. Three-dimensional imaging is acquired by recovering the absolute phase shift that is caused by the sample as compared with the relative phase shift recovered in the 2D scheme and the use of a reference beam split before the Nomarski prism. By interfering the reference beam with the sampling beam, the absolute phase shift converts into intensity information.

The invention may be better understood with reference to the accompanying examples, which are intended for purposes of illustration only and should not be construed as in any sense limiting the scope of the present invention as defined in the claims appended hereto.

EXAMPLE 1

In order to prove the concepts of the invention, a computer model was created for the system described schematically in FIG. 2A and FIG. 2B that used a crenated sample with a 30 µm width to test the system. The model specimen was meant as a crude example of a typical application such as identification of a certain type of diseased cells. In this simulation, the resolution is assumed to be 0.5 micron and the two adjacent points are 0.2 µm apart. These are typical numbers for a conventional DIC microscope.

The model of FIG. 2A and FIG. 2B was used and a broadband pulse laser was adopted to generate the probe beam. The beam was mapped into space using a spatial-disperser such as diffraction grating or prism. The spatially-dispersed beam was split into two beams with orthogonal polarization states using a Nomarski/Wollaston prism. The two beams were focused on the sample such that every two adjacent points were illuminated by a certain wavelength but with two different polarizations. After traveling through the sample, the two polarized beams are combined using a second Nomarski/Wollaston prism. The optical path difference between the two adjacent points results in constructive/deconstructive interference of certain wavelengths. The spatially dispersed and spectrally-encoded pulses are spatially compressed using another diffraction grating (or prism). The amplified dispersive Fourier transformation was performed to convert the spectrum of the pulses into time and amplify them simultaneously. Distributed amplification can be achieved using Raman amplification and dispersion compensating fibers. A single-pixel photodetector and a commercial digitizer can be used to receive the time-encoded pulses. Post-signal processing is performed to construct the images.

In one implementation, a broadband laser pulse is dispersed in one dimension using a diffraction grating. It therefore performs a 1D line scan of the sample. The process is repeated by subsequent laser pulses that arrive at the laser pulse repetition frequency (typically tens of MHz). At the same time, the samples—cells in the flow cytometry application—are moving in the axial direction—perpendicular to the line-scanning direction. Hence each line scan creates a single 1D image but at an incrementally different axial line compared to the adjacent pulses.

Two dimensional images are then obtained by these line scans. The scan rate of this technique is determined by the repetition rate of the pulse laser.

The technique can also be extended to 3D imaging by recovering the absolute phase shift caused by the sample, compared to the relative phase shift in 2D approach described above. In the 2D configuration, the interference process converts to amplitude the relative phase shift difference between the two orthogonally-polarized beams. This provides information about the relative optical path length between two adjacent in-plane points. The axial information, which must be recovered for 3D imaging, is contained in the absolute phase shift. This phase shift can be recovered by adding a reference beam. As seen in the embodiment of FIG. 2A and FIG. 2B, the beam is split into two beams before the Nomarski prism and combined back after the second Nomarski prism. Therefore, the overall intensity detected by the photodetector can be written as:

$$I_T = \left(\frac{E_0}{2}\right)^2 \left(\frac{3}{2} + \frac{1}{2}\cos(\varphi_2 - \varphi_1) + \cos(\varphi_2) + \cos(\varphi_1)\right).$$

As can be seen in the expression above, the amplitude modulation is now a function of both the absolute phase shifts ($\phi_1$ and $\phi_2$) and the differential phase shift ($\phi_2 - \phi_1$). Assuming $\phi_2 - \phi_1 \ll \phi_1, \phi_2$, the terms $\cos(\phi_2)$ and $\cos(\phi_1)$ cause faster modulations compared to the term $\cos(\phi_2 - \phi_1)$. By low-pass filtering $I_T$, DC term and the low frequency term ($\cos(\phi_2 - \phi_1)$) are extracted. Thus, absolute phase values, $\phi_1$ and $\phi_2$, and therefore the sample thickness (axial dimension) at both points can be found, leading to a 3D image.

In contrast to conventional light microscopes, the methods can image samples with refractive index similar to their surroundings. Moreover, picking up the sample profile of two points, which are ≥0.2 µm apart, will result in unrivaled resolution among standard optical microscopes.

EXAMPLE 2

In order to illustrate the methods for fabrication and the functionality of the differential interference contrast serial time encoded amplified microscopy system, an imager apparatus was constructed according the general schematic shown in FIG. 1. Both one dimensional and two dimensional images of a sample were obtained. The second dimension of the images was obtained by translating the sample in the direction orthogonal to that of the line scans. The sample was a transparent material with periodically refractive-index modulation (i.e. a transmission grating with groove density of ~70 lines/mm).

The optical source was a mode-locked laser with a center wavelength of 1560 nm and a pulse repetition rate of 36.1 MHz. A highly nonlinear fiber and optical band-pass filter following the laser produced a train of pulses with ~20 nm bandwidth centered at 1591 nm was used as an illumination beam.

Using a pair of diffraction gratings with 1100 lines/mm groove density, the pulses were spatially-dispersed into a 1D rainbow pattern enabling 1D line-scanning of the test object. The 1D spatially-dispersed beam was sent to a half-wave plate and a polarizer to rotate the polarization state of the light and ensure 45-degree linear polarization incident on the Nomarski prism. The Nomarski prism split the illumination beam into two orthogonally-polarized 1D rainbow patterns (0 and 90 degrees). The design of the Nomarski prism and the optics that followed were such that the two orthogonally-polarized beams were ~3 µm apart on the object in the direction normal to the direction of the line scan as shown in FIG. 3. A mirror was placed at the back of the sample to return the phase-encoded beams through the same optics, which resulted in double passing of the illumination beams through the object, and hence, doubles the phase shifts. After recombining the phase encoded beams using the same Nomarski prism, the spectrally-encoded beam was directed to a spool of dispersive fiber (with dispersion value of –662 ps/nm) via an optical circulator to perform amplified dispersive Fourier transformation. The time-encoded optical pulses were then captured by a high-speed photodetector and digitized by a real-time digitizer with 16 GHz bandwidth and 50 GS/s sampling rate (Tektronix—DPO71604). Digital signal processing including background and noise removal was performed offline to reconstruct the images.

The number of image pixels was found to be N=D.Δλ.fdig=662, where D is the total dispersion in the dispersive fiber (D=–662 ps/nm), Δλ is the optical bandwidth (Δλ=20 nm), and fdig is the sampling rate of the digitizer (fdig=50 GS/s). The number of resolvable points was estimated to be ~100 from the spectral resolution of the ADFT process. Accordingly, the dwell time (shutter speed) was found to be ~60 ps from the bandwidth of each subpulse or wavelength component (20 nm/100) in the line scan. The temporal waveform indicated the repetitive pulses (corresponding to the line scans) detected by a single-pixel photodetector had a 36.1 MHz frame rate. In other words, real-time capture of time-domain pulses enabled pulse-to-pulse (frame-by-frame) image acquisition at 36.1 MHz rate in this example.

The design of transmission grating was such that the refractive-index modulation is small and the reflections from different points on the sample were below the sensitivity of a conventional STEAM imager. With the Nomarski prism, the system provided the differential phase-contrast in imaging of the sample and showed significant contrast-enhancement using the apparatus. The observed high-intensity lines in the obtained image were ~14 µm apart, which agreed with the specifications of the transmission grating (i.e., 70 lines/mm groove density).

EXAMPLE 3

In order to further demonstrate the functionality of the methods and imager, the apparatus shown in FIG. 1 was constructed and used for high-speed, high-contrast imaging of fast-flowing unstained white blood cells. White blood cells were isolated from whole blood by hypotonic lysis of red blood cells and re-suspended in phosphate buffered saline.

The optical source that was used was a mode-locked laser with a center wavelength of 1560 nm and a pulse repetition rate of 36.1 MHz. A highly nonlinear fiber and optical bandpass filter following the laser produces a train of pulses with ~20 nm bandwidth centered at 1591 nm as an illumination beam. Using a pair of diffraction gratings with 1100 lines/mm groove density, the pulses were spatially-dispersed into a 1D rainbow pattern enabling 1D line-scanning of the object. The 1D spatially-dispersed (i.e., 1D rainbow) were sent to a half-wave plate and a polarizer to rotate the polarization state of the light and to ensure a 45-degree linear polarization incident on the Nomarski prism. The Nomarski prism split the illumination beam into two orthogonally-polarized 1D rainbow patterns (0 and 90 degrees). The design of the Nomarski prism and the following optics are such that the two orthogonally-polarized beams are ~3 μm apart at the object in the direction normal to the direction of the line scan as illustrated in FIG. 3. A mirror 50 was placed at the back of the object to return the phase-encoded beams to the same optics, which results in double passing of the illumination beams through the object, and hence, doubles the phase shifts as illustrated in FIG. 1.

After recombining the phase-encoded beams using the same Nomarski prism 40, the spectrally-encoded beam is directed to a spool of dispersive fiber (with dispersion value of −1373 ps/nm) via an optical circulator to perform amplified dispersive Fourier transformation. The time-encoded optical pulses are then captured by a high-speed photodetector and digitized by a real-time digitizer with 16 GHz bandwidth and 50 GS/s sampling rate (Tektronix—DPO71604). Digital signal processing including background and noise removal was performed offline to reconstruct the image of the object under test.

Also, in order to uniformly position and flow cells to be imaged, inertial microfluidic technology was employed. This technology enabled focusing and ordering of cells at very fast flow rate, while eliminating the need for sheath fluid. The cells had a flow speed of ~1 m/s in the direction orthogonal to that of the line scans providing 400-500 image pixels in the flow direction.

The number of image pixels in this demonstration was found to be $N=|D|\Delta\lambda f_{dig}=1373$, where D is the total dispersion in the dispersive fiber (D=−1373 ps/nm), $\Delta\lambda$ is the optical bandwidth ($\Delta\lambda$=20 nm), and $f_{dig}$ is the sampling rate of the digitizer ($f_{dig}$=50 GS/s). The number of resolvable points was estimated to be ~175 from the spectral resolution of the ADFT process. Accordingly, the dwell time (shutter speed) was found to be ~40 ps from the bandwidth of each sub-pulse or wavelength component (20 nm/175) in the line scan. The temporal waveform that was observed indicated the repetitive pulses (corresponding to the line scans) detected by a single-pixel photodetector and illustrates the operation of apparatus at a 36.1 MHz frame rate. In other words, real-time capture of time-domain pulses enables pulse-to-pulse (frame-by-frame) image acquisition at a 36.1 MHz rate.

For purposes of comparison, 2D images were obtained with the apparatus and with a conventional STEAM imager. The two dimensional images captured by the apparatus were based on the relative phase shift between the illumination beams when propagating through the cell, while the images captured by STEAM showed the reflectivity from the surface of the cell. Interestingly, the image contrast of the white blood cell captured by apparatus was >10 times higher than that of captured by a conventional STEAM apparatus. This was due to poor refractive-index contrast of unstained white blood cells compared to their aqueous surrounding. Interestingly, since the apparatus reveals the optical density of the cell (i.e., the product of refractive index and size), it is capable of distinguishing different types of cells that are similar in size, and provides a path to high-throughput imaging-based flow cytometry and cell sorting.

From the discussion above it will be appreciated that the invention can be embodied in various ways, including the following:

1. An apparatus for optical imaging, comprising a broadband pulsed laser light source; a spatial disperser stage operably coupled to the light source producing a polarized spatially dispersed beam; a Nomarski prism operably coupled to the spatial disperser stage; an objective lens configured to direct a spatially dispersed beam from the Nomarski prism to a specimen; a mirror; a temporal disperser stage configured to map a back-reflected spectrum into a temporal waveform; an optical detector; and a digitizer.

2. The apparatus of embodiment 1, wherein the broadband pulsed laser source comprises: a mode-locked laser; a highly non-linear fiber; a bandpass filter; and a fiber collimator.

3. The apparatus of embodiment 1, wherein said spatial disperser stage comprises: a half-wave plate; a quarter-wave plate; a pair of diffraction gratings; a pair of vertical telescoping lenses; a pair of horizontal telescoping lenses; a half wave plate; and a polarizer.

4. The apparatus of embodiment 1, the objective lens further comprising: a cylindrical lens operably coupled to the Nomarski prism; and a spherical lens operably coupled with an objective lens.

5. The apparatus of embodiment 1, wherein the temporal disperser stage comprises: an optical circulator; a spool of dispersive fiber operably coupled to the optical circulator; and a plurality of optical pumping continuous wave lasers coupled to the dispersive fiber operating at different center wavelengths.

6. An apparatus for optical imaging, comprising: a broadband pulsed laser light source; an encoding spatial disperser stage operably coupled to the light source producing a polarized spatially dispersed beam; a first Nomarski prism operably coupled to the spatial disperser stage; a first objective lens configured to direct a spatially dispersed beam from the Nomarski prism to a specimen; a second objective lens; a second Nomarski prism operably coupled to the second objective lens; a second spatial disperser stage; a temporal disperser stage operably coupled to the second spatial disperser stage; an optical detector; and a digitizer.

7. The apparatus of embodiment 6, wherein said broadband pulsed laser source comprises: a mode-locked laser; a highly non-linear fiber; a bandpass filter; and a fiber collimator.

8. The apparatus of embodiment 6, wherein the first and second spatial disperser stages comprise: a half-wave plate; a quarter-wave plate; a pair of diffraction gratings; a pair of vertical telescoping lenses; a pair of horizontal telescoping lenses; a half wave plate; and a polarizer.

9. The apparatus of embodiment 6, wherein the first and second objective lenses further comprise: a cylindrical lens operably coupled to the Nomarski prism; and a spherical lens operably coupled with and an objective lens.

10. The apparatus of embodiment 6, wherein the temporal disperser stage comprises: an optical circulator; a spool of dispersive fiber operably coupled to the optical circulator; and a plurality of optical pumping continuous wave lasers coupled to the dispersive fiber operating at different center wavelengths.

11. A method of optical imaging, comprising: generating orthogonally polarized spatially dispersed beams with a broadband pulsed laser source, a spatial disperser and a Nomarski prism; exposing a sample to the spatially dispersed beams; encoding spatial information of the sample into the spectrum of the exposed spatially dispersed beam; mapping the encoded spectrum into a temporal waveform with a temporal disperser to produce an encoded serial time-domain waveform; processing the encoded serial time-domain waveform to produce an image.

12. The method of embodiment 11, wherein the broadband pulsed laser source is produced by passing a laser beam from a mode-locked laser through a highly non-linear fiber, bandpass filter and fiber collimator.

13. The method of embodiment 11, wherein the spatial disperser comprises a first diffraction grating, a second diffraction grating, optical lenses and a polarizer.

14. The method of embodiment 13, wherein the spatial disperser further comprises a half wave plate and a quarter wave plate disposed in a beam path prior to the first diffraction grating.

15. The method of embodiment 11, wherein the exposed spatially dispersed beam from the sample is further directed through an objective lens, a second Nomarski prism, an analyzer, a half wave plate, optical lenses, a third diffraction grating and a fourth diffraction grating before temporal mapping.

16. The method of embodiment 11, further comprising: amplifying the mapped encoded serial time-domain waveform by optical pumping of a temporal dispersive element with at least one secondary light source.

17. The method of embodiment 11, further comprising: exposing the sample to a second spatially dispersed beam generated from a broadband pulsed laser source, a spatial disperser and a Nomarski prism oriented orthogonally to a first spatially dispersed beam.

18. The method of embodiment 17, further comprising: recovering the absolute phase shift caused by the sample; and generating a three-dimensional image.

19. The method of embodiment 11, wherein the processing comprises: capturing the waveform with a photodiode; digitizing the captured waveform to provide a digital signal; and processing the digital signal to produce an image.

20. A method of optical imaging, comprising: generating a plurality of spatially dispersed beams with broadband pulsed laser source, a spatial disperser and a Nomarski prism; exposing a sample to the spatially dispersed beams; encoding spatial information of the sample into the spectrum of the exposed spatially dispersed beam; reflecting the exposed spatially dispersed beam back through the sample and Nomarski prism; mapping the encoded spectrum into a temporal waveform with a temporal disperser to produce an encoded serial time-domain waveform; processing the encoded serial time-domain waveform to produce an image.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for optical imaging, comprising:
    a broadband pulsed laser light source;
    a spatial disperser stage operably coupled to the light source producing a polarized spatially dispersed beam;
    a Nomarski prism operably coupled to the spatial disperser stage;
    an objective lens configured to direct a spatially dispersed beam from the Nomarski prism to a specimen;
    a mirror;
    a temporal disperser stage configured to map a back-reflected spectrum into a temporal waveform;
    an optical detector; and
    a digitizer.

2. An apparatus as recited in claim 1, wherein said broadband pulsed laser source comprises:
    a mode-locked laser;
    a highly non-linear fiber;
    a bandpass filter; and
    a fiber collimator.

3. An apparatus as recited in claim 1, wherein said spatial disperser stage comprises:
    a half-wave plate;
    a quarter-wave plate;
    a pair of diffraction gratings;
    a pair of vertical telescoping lenses;
    a pair of horizontal telescoping lenses;
    a half wave plate; and
    a polarizer.

4. An apparatus as recited in claim 1, the objective lens further comprising:
    a cylindrical lens operably coupled to the Nomarski prism; and
    a spherical lens operably coupled with an objective lens.

5. An apparatus as recited in claim 1, wherein said temporal disperser stage comprises:
    an optical circulator;
    a spool of dispersive fiber operably coupled to the optical circulator; and
    a plurality of optical pumping continuous wave lasers coupled to the dispersive fiber operating at different center wavelengths.

6. An apparatus for optical imaging, comprising:
    a broadband pulsed laser light source;
    an encoding spatial disperser stage operably coupled to the light source producing a polarized spatially dispersed beam;
    a first Nomarski prism operably coupled to the spatial disperser stage;
    a first objective lens configured to direct a spatially dispersed beam from the Nomarski prism to a specimen;
    a second objective lens;
    a second Nomarski prism operably coupled to the second objective lens;
    a second spatial disperser stage;
    a temporal disperser stage operably coupled to the second spatial disperser stage;
    an optical detector; and
    a digitizer.

7. An apparatus as recited in claim 6, wherein said broadband pulsed laser source comprises:
a mode-locked laser;
a highly non-linear fiber;
a bandpass filter; and
a fiber collimator.

8. An apparatus as recited in claim 6, wherein the first and second spatial disperser stages comprise:
a half-wave plate;
a quarter-wave plate;
a pair of diffraction gratings;
a pair of vertical telescoping lenses;
a pair of horizontal telescoping lenses;
a half wave plate; and
a polarizer.

9. An apparatus as recited in claim 6, wherein said first and second objective lenses further comprise:
a cylindrical lens operably coupled to the Nomarski prism; and
a spherical lens operably coupled with and an objective lens.

10. An apparatus as recited in claim 6, wherein said temporal disperser stage comprises:
an optical circulator;
a spool of dispersive fiber operably coupled to the optical circulator; and
a plurality of optical pumping continuous wave lasers coupled to the dispersive fiber operating at different center wavelengths.

11. A method of optical imaging, comprising:
generating orthogonally polarized spatially dispersed beams with a broadband pulsed laser source, a spatial disperser and a Nomarski prism;
exposing a sample to the spatially dispersed beams;
encoding spatial information of the sample into the spectrum of the exposed spatially dispersed beam;
mapping the encoded spectrum into a temporal waveform with a temporal disperser to produce an encoded serial time-domain waveform;
processing the encoded serial time-domain waveform to produce an image.

12. A method as recited in claim 11, wherein said broadband pulsed laser source is produced by passing a laser beam from a mode-locked laser through a highly non-linear fiber, bandpass filter and fiber collimator.

13. A method as recited in claim 11, wherein said spatial disperser comprises a first diffraction grating, a second diffraction grating, optical lenses and a polarizer.

14. A method as recited in claim 13, wherein said spatial disperser further comprises a half wave plate and a quarter wave plate disposed in a beam path prior to the first diffraction grating.

15. A method as recited in claim 11, wherein said exposed spatially dispersed beam from said sample is further directed through an objective lens, a second Nomarski prism, an analyzer, a half wave plate, optical lenses, a third diffraction grating and a fourth diffraction grating before temporal mapping.

16. A method as recited in claim 11, further comprising:
amplifying the mapped encoded serial time-domain waveform by optical pumping of a temporal dispersive element with at least one secondary light source.

17. A method as recited in claim 11, further comprising:
exposing the sample to a second spatially dispersed beam generated from a broadband pulsed laser source, a spatial disperser and a Nomarski prism oriented orthogonally to a first spatially dispersed beam.

18. A method as recited in claim 17, further comprising:
recovering the absolute phase shift caused by the sample; and
generating a three-dimensional image.

19. A method as recited in claim 11, wherein said processing comprises:
capturing said waveform with a photodiode;
digitizing said captured waveform to provide a digital signal; and
processing the digital signal to produce an image.

20. A method of optical imaging, comprising:
generating a plurality of spatially dispersed beams with broadband pulsed laser source, a spatial disperser and a Nomarski prism;
exposing a sample to the spatially dispersed beams;
encoding spatial information of the sample into the spectrum of the exposed spatially dispersed beam;
reflecting the exposed spatially dispersed beam back through the sample and Nomarski prism;
mapping the encoded spectrum into a temporal waveform with a temporal disperser to produce an encoded serial time-domain waveform;
processing the encoded serial time-domain waveform to produce an image.

* * * * *